(12) United States Patent
Huebner et al.

(10) Patent No.: US 8,968,689 B2
(45) Date of Patent: Mar. 3, 2015

(54) METHOD FOR RECOVERING POTASSIUM SULPHATE FROM BIODIESEL PRODUCTION

(75) Inventors: Andreas Huebner, Nordhausen (DE); Alfred Schiffer, Luenen (DE)

(73) Assignee: Remondis Production GmbH (DE)

( * ) Notice: Subject to any disclaimer, the term of this patent is extended or adjusted under 35 U.S.C. 154(b) by 0 days.

(21) Appl. No.: 13/885,434

(22) PCT Filed: Nov. 16, 2011

(86) PCT No.: PCT/EP2011/005775
§ 371 (c)(1),
(2), (4) Date: May 15, 2013

(87) PCT Pub. No.: WO2012/065731
PCT Pub. Date: May 24, 2012

(65) Prior Publication Data
US 2013/0230439 A1 Sep. 5, 2013

(30) Foreign Application Priority Data

Nov. 16, 2010 (DE) .......................... 10 2010 051 512

(51) Int. Cl.
*C01F 11/00* (2006.01)
*C01D 5/16* (2006.01)
*C05D 1/02* (2006.01)
(52) U.S. Cl.
CPC ... *C01D 5/16* (2013.01); *C05D 1/02* (2013.01)
USPC .......................................................... 423/207

(58) Field of Classification Search
None
See application file for complete search history.

(56) References Cited

U.S. PATENT DOCUMENTS 3,006,726 A * 10/1961 Simon ........................... 423/179
4,144,311 A 3/1979 Grosche et al.

FOREIGN PATENT DOCUMENTS

| DE | 102004024697 A1 | 12/2005 |
| EP | 0001533 A2 | 4/1979 |
| JP | 51079963 A | 7/1976 |
| JP | 9327688 A | 12/1997 |
| SU | 630225 A1 | 10/1978 |
| WO | 2006051574 A2 | 5/2006 |

OTHER PUBLICATIONS

International Search Report for PCT/EP2011/005775 dated Mar. 15, 2012.

* cited by examiner

*Primary Examiner* — Steven Bos
(74) *Attorney, Agent, or Firm* — Heslin Rothenberg Farley & Mesiti, P.C.

(57) ABSTRACT

A method is disclosed for treating residues from biodiesel production for the isolation of highly pure potassium sulphate from potassium sulphate-containing sludge. First, potassium sulphate-containing sludge from biodiesel production is heated in the first stage under non-oxidizing conditions to a material temperature between 400 and 700° C.; in a second stage the product from the first stage is heated under oxidizing conditions to material temperatures between 700 and 900° C.

19 Claims, 1 Drawing Sheet

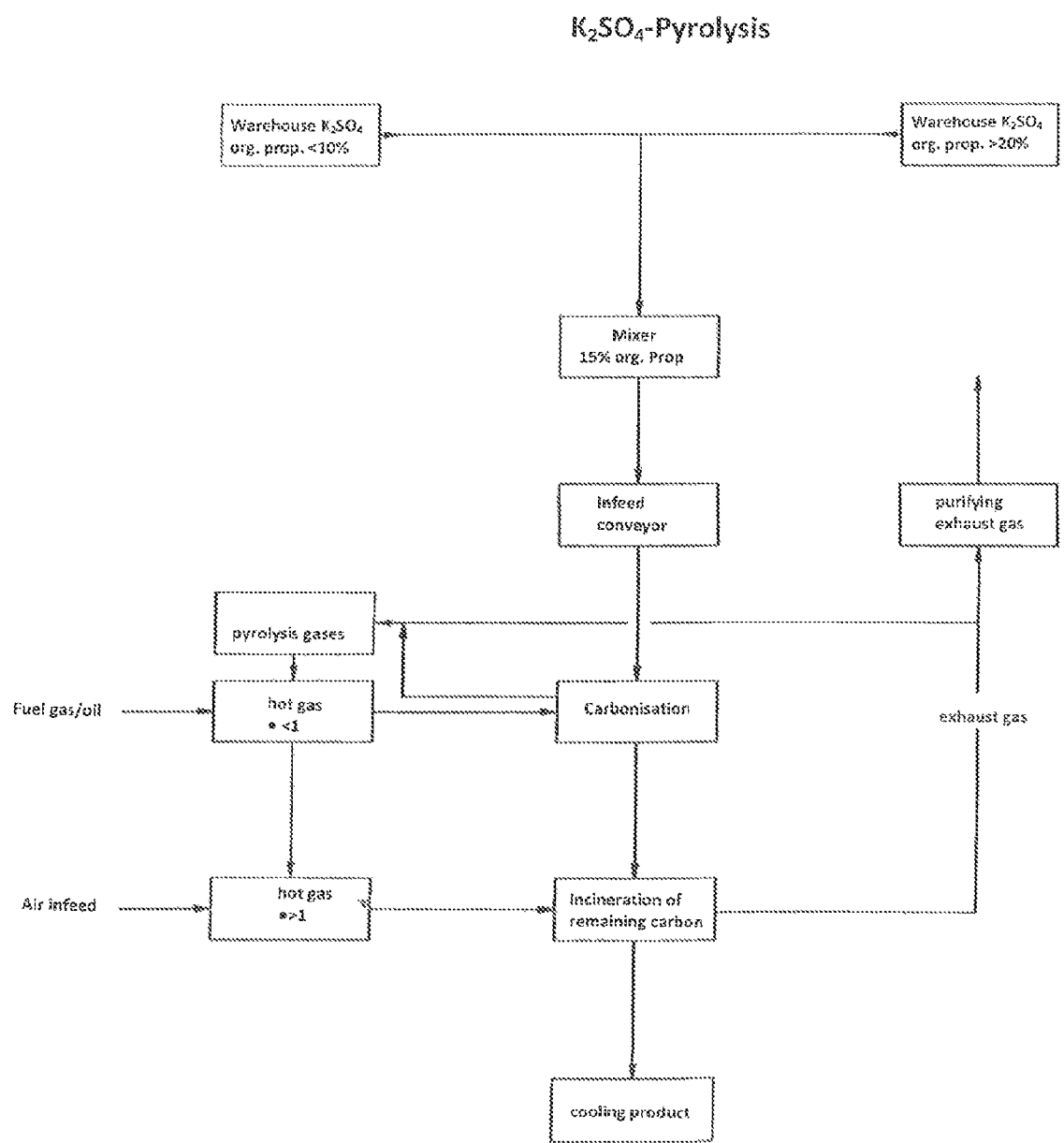

METHOD FOR RECOVERING POTASSIUM SULPHATE FROM BIODIESEL PRODUCTION

CROSS REFERENCE TO RELATED APPLICATIONS

This application is a U.S. National Phase filing under 35 U.S.C. §371 of International Application PCT/EP2011/005775, filed Nov. 16, 2011, and published as WO 2012/065731 on May 24, 2012. PCT/EP2011/005775 claimed benefit of priority from German Application 102010051512.4, filed Nov. 16, 2010. The entire contents of each of the prior applications are incorporated herein by reference.

TECHNICAL BACKGROUND OF THE INVENTION

The present invention refers to a method for recovering highly pure potassium sulphate from residues from biodiesel production. The invention also refers to a system suitable for implementation of said method.

Biodiesel is a synthetic fuel. It is obtained by transesterification of animal or pant derived fatty acid glycol esters with methanol. In many countries biodiesel is added to regular, mineral diesel fuel. In 2007 a mandatory addition of 4.4% biodiesel to regular diesel was introduced by law in Germany and many other countries have introduced corresponding legislation since. Consequently, the production of biodiesel has greatly increased in the last years.

The increase in biodiesel production naturally leads to an increase in processing residues such as sludges, which are a result of the production process—however an economically feasible processing of valuable and re-usable substances from the processing residues is an unsolved challenge at the moment. The processing residues comprise residue sludges, which can be used for recycling. The sludges used in said reprocessing method contain a high degree of organic substances (approx. 5% to approx. 50%). Those organic substances prevent the use of the substances recycled from the processing residues in high quality processes which require the use of defined substances, and poorly defined substances with organic contaminants would perturb such processes.

One of the compounds which is generated during the production of biodiesel, and whose reprocessing is of high interest economically, is potassium sulphate. Different uses of potassium sulphate-containing residues from biodiesel production are known in the art. In DE 10 2004 024 697 A1 it is proposed to mix oil-containing residues with residues of fire extinguisher powder, thus releasing anorganic hydrophobied salts which are then usable as fertilizer. The oil-containing component of potassium sulphate-containing residues of biodiesel production is mentioned as one of such oil-containing residues. WO 2006/051574 discloses improvements regarding cement, wherein the compression strength can be improved by addition of pure glycerine, containing anorganic alkalimetal salts, as aggregate material during cement production. Here, glycerin, obtained as a by-product of alkylester-production from plant oils (e.g. rapeseed oil), is used, thus the glycerin naturally also contains potassium sulphate (4-6 weight %). The uses proposed in these patent applications, however, wherein potassium sulphate is used as a fertilizer or aggregate material, are not very interesting, economically. Only highly pure potassium sulphate can be employed in economically interesting further uses. Such uses comprise, for example, the use as activator salts in plaster hardening, or in anhydrite binders for floating screed. The prior art, however, does not propose the reprocessing of residues with the aim of the purest possible potassium sulphate.

If residues of biodiesel production are treated at all, this is typically done by uncontrolled incineration/heating of the residues with unobstructed supply of air. Typically, at temperatures of 450-600° C., organic decomposition products such as monomeric styrene, benzene, tolouene, ethyl benzene, methyl styrene and PAHs (poly aromatic hydrocarbons) are formed from organic contaminations of the residues. Further, fatty acid methyl esters, such as methylmyristate, methylpalmitate, and methylstearate, exist in the flue gas of the so-formed pyrolizate. Uncontrolled heating under oxidizing conditions leads to disintegration of the organic contaminants into diverse byproducts. In the emerging reducing atmosphere and due to the very tight mixing of the fine grained potassium sulphate with the other elements forming the sludge, the sulphur with oxidation state +6, of the sulphate, is reduced to sulphur with oxidation state −2, elementary sulphur with oxidation state 0, or sulphitic sulphur compounds with oxidation state +4. Just as the organic decomposition products also these compounds are undesired residues and prevent high quality technical uses of potassium sulphate, in one way or another. Altogether decomposition products (organic or sulphur compounds), already in low concentrations, impede the use of potassium sulphate in many downstream uses.

Organic contaminants lead to changes in the crystal structure of emerging plaster crystals, for example, when potassium sulphate is used as initiator in acqeuos plaster-and other calcium sulphate containing suspensions, wherein potassium sulphate is used as setting accelerator. This leads to insufficient final strength so that the promised properties of the mortar that is to be processed, cannot be complied with. Also, the use as initiator in anhydrit binders for floating screed is only possible if the potassium sulphate is appropriately pure.

The problem to be solved by the present invention was therefore the development of a method, and a corresponding system, with which the organic ingredients of the residue sludges from the biodiesel production can be eliminated almost completely while in parallel, the decomposition of the existing sulphate in the treated material quantities is prevented.

It would be particularly advantageous if the proportion of organic contaminants in reprocessed potassium sulphate is decreased to <0.001%. The potassium sulphate containing residues which are separated during the biodiesel production process contain between 5% and 50% organic components, depending on the production-and reprocessing plant. Advantageously, the method of the invention should therefore remove >99.999% of the organic components. At the same time the method should be conducted such that a reduction of sulphur with oxidation state +6 to lower oxidation states (+4−, +2−,0, −2) is efficiently prevented.

Advantageously, the method should also allow the effective extraction of potassium sulphate directly from biodiesel production and/or the quality of the so obtained potassium sulphate should be in a beneficial ratio regarding the necessary cost for the production.

This object is accomplished by a method according to the invention, as per the main claim.

The invention thus refers to a method for use in the treatment of residues from biodiesel production, for the isolation of highly pure potassium sulphate from potassium sulphate-containing sludge, characterized in that the method is carried out in two spatially and/or temporally separate stages, wherein in the first stage potassium sulphate-containing sludge is initially heated under non-oxidizing conditions —preferably under a nitrogen atmosphere—at material temperatures between 400 and 700° C., preferably between 450 and 600° C.; and in a second stage the product of the first stage is heated under oxidizing conditions, at material temperatures between 700 and 900° C., preferably between 750 and 850° C.

In the first stage in the organic contaminants of the potassium sulphate containing sludge are pyrolyzed at the defined temperatures under the non-oxidizing conditions and are fully reduced to elementary carbon.

In the second stage the carbon is oxidized to carbon dioxide. Here it is intended from a procedural point of view that no sulfidic sulphur (oxidation state -II) is created.

The method according to the invention has a number of advantages. Firstly, using the method according to the invention, the proportion of organic contaminants in the reprocessed potassium sulphate can be lowered to <0.01 weight % , or even <0.001 weight %, even if, originally, the potassium sulphate containing processing residues contained up to 50% organic components. Further, the method can be performed in such a way that the reduction of sulphur with oxidation state +6 to lower oxidation states (+4−, +2, 0, −2) is efficiently prevented. Furthermore, despite significant cost with respect to energy, the method according to the invention is a very cost effective method for the production/recovery of a highly valuable raw material. This method can also be conducted in a continuous fashion for the effective extraction of potassium sulphate directly from biodiesel production.

The term "residue from the biodiesel production", according to the invention, refers to any residue, which is a result of the industrial biodiesel production process—typically from plant oil—and which has been separated from the biodiesel. In particular, the term refers to residue materials from the esterification stage in the biodiesel production as well as potassium sulphate containing sludge.

The term "potassium sulphate containing sludge", according to the invention, refers to a residue from the industrial biodiesel production which contains oil and potassium sulphate, and which has been separated from the biodiesel. Typically, the "potassium sulphate containing sludge" as defined herein contains between 5% and 50% of organic components.

The term "highly pure potassium sulphate", according to the invention, refers to potassium sulphate, isolated in accordance with the method from potassium sulphate containing sludge, wherein the proportion of organic contaminants in the potassium sulphate isolated from the processing residues, in particular from potassium sulphate containing sludge, is <0.01%, preferably <0.001%.

The term "under non-oxidizing conditions", according to the invention, refers to heating the potassium sulphate containing sludge in the first stage in such a way that the gaseous atmosphere at the interfaces of the heated potassium sulphate containing sludge is—entirely or at least almost entirely— free of oxygen. Preferably, the term "non-oxidizing conditions" is understood as "reducing conditions". Preferably, in order to create "non-oxidizing conditions" a gas which under the prevailing conditions is inert, oxygen free, or at least oxygen deficient, such as nitrogen, carbon dioxide or water vapour, is blown into the reaction space (for example, into a first rotary tube or the upper tier(s) of a hearth-type furnace), in which the first stage is performed.

The term "under nitrogen atmosphere", according to the invention, refers to heating the potassium sulphate containing sludge in a first stage in such a way that the gaseous atmosphere at the interfaces of the heated potassium sulphate containing sludge consists—entirely or at least almost entirely—of nitrogen. Preferably, a protective gas (oxygen free, or at least oxygen deficient), such as nitrogen or exhaust gas of an understochiometric incineration, is blown into the reaction space (for example, into a first rotary tube), in which the first stage is performed.

The term "under oxidizing conditions", according to the invention, refers to heating the material (the potassium sulphate containing sludge which had been pretreated in the first stage) in the second stage in such a way that the gaseous atmosphere at the interfaces of the heated material contains oxygen, and for example is air. Preferably, to this end, an oxygen containing gas, in particular air, is blown into the reaction space (for example, into a second rotary tube), in which the second stage is performed.

The term "heating to material temperature of . . . ", according to the invention, refers to the temperature inside the treated material (in the first stage the potassium sulphate containing sludge; in the second step, the potassium sulphate containing sludge which was pretreated in the first step) to which temperature the material is heated.

In a preferred embodiment of the method according to the invention the heating in the first stage is performed in a first reaction space, and in a second reaction space in the second stage and the first and/or second reaction space is designed such that the transport within the reactor takes place without re-mixing. Here, the first and/or second reaction space can be dimensioned in an elongated fashion and can have a longitudinal axis. It is particularly preferred that during the heating of the first stage in the first reaction space and/or during the heating of the second stage in the second reaction space, the treated potassium sulphate containing sludge is transported (for example along the longitudinal axis) from one end of the respective reaction space (the beginning) to the other end of the reaction space (the end).

The remixing can be suppressed in accordance with the method, by adjusting the number of baffle rings in longish dimensioned rotary tubes, and by adjusting the number of tiers in multi-tier furnaces. The term "longish dimensioned" according to the invention is meant to refer to the object/reaction space having a greater extension into one of the three dimensions when compared to the other dimensions. Examples for longish dimensioned reaction spaces are for example the pipe of a rotary kiln or hearth-type furnaces equipped with several tiers.

The term "longitudinal axis" according to the invention, is understood to refer to the axis through a body which corresponds to the direction of its greatest extension.

In a preferred embodiment of the method according to the invention, in the first stage the potassium sulphate containing sludge is fumigated with an oxygen free gas, preferably with nitrogen, in particular with nitrogen in a ratio of 0.2-0.22 $Nm^3/kg$, based on the weight of the treated potassium sulphate containing sludge.

In a further preferred embodiment of the method according to the invention the flue gas which is being formed in the first stage is removed and is transferred to thermal afterburning.

In a very preferred embodiment of the method according to the invention the retention time of the individual treated potassium sulphate containing sludge in the first stage is adjusted such that at the end of the treatment of the first stage the treated potassium sulphate containing sludge contains almost only potassium sulphate and elementary carbon In a preferred embodiment of the method according to the invention, in the second stage the potassium sulphate containing sludge is fumigated with an oxygen-containing gas, preferably with air, in particular with air in a ratio of 0.05-0.5, preferably 0.1-0.2 Nm$^3$/kg, based on the weight of the treated potassium sulphate containing sludge. Preferably, in the second stage the potassium sulphate containing sludge is fumigated with an oxygen-containing gas, preferably with air, in particular with air in a ratio of 0.05-0.5, preferably 0.1-0.2 Nm$^3$/kg, based on the weight of the treated potassium sulphate containing sludge, wherein the fumigation with the oxygen containing gas is carried out in counterflow, wherein the treated potassium sulphate containing sludge in the second reaction space is moved into a direction (for example of a longitudinal axis) and preferably is constantly circulated by corresponding devices. Here the stream of oxygen containing gas streams against the direction of motion of the treated potassium sulphate containing sludge. Thus, the oxygen containing, counter-streaming, gas reaches the, so far, not oxidized carbon particles in the potassium sulphate without a meaningful diffusion course. Therefore, a controlled oxidation of the remaining carbon in the potassium sulphate is achieved, without the released combustion heat leading to a rise in temperature of the potassium sulphate above its sintering temperature.

In a preferred embodiment of the method according to the invention, the retention time of the individual treated potassium sulphate containing sludge in the second stage is 1 h to 2 h, preferably 1.25 h to 1.75 h. Generally the retention time is adjusted such that the carbon content at the material discharge is <0.01%. It is therefore particularly preferred, if in the method of the invention the retention time in the second stage is adjusted such that the carbon content at the material discharge is <0.01%.

In a preferred embodiment of the method according to the invention
 the heating in the first and second stage is carried out in a reaction space which is dimensioned in a longish fashion, and
 the treated potassium sulphate-containing sludge in the first and second stage is transported, in the interior of the reaction space, in direction of the longitudinal axis from one end of the reaction space (the beginning) to the other end of the reaction space (the end), wherein the treated potassium sulphate-containing sludge is transported from the end of the first reaction space into the beginning of the second reaction space, while
 the retention time of the individual treated potassium sulphate-containing sludge in the first stage is adjusted such hat at the end of the treatment of the first stage (reaching the end of the first reaction space) the treated potassium sulphate containing sludge contains almost only potassium sulphate and elementary carbon, and
 the retention time of the individual treated potassium sulphate sludge is adjusted in the second stage to 1 h to 2 h, preferably 1.25 h to 1.75 h.

In a preferred embodiment of the method according to the invention, the heating in the first stage and/or the second stage is carried out in a rotary tube—preferably equipped with baffle rings —, preferably in a rotary tube of a rotary kiln in which the rotary tube can be heated through the outer wall, wherein preferably the rotary tube or the pipe of the rotary kiln during heating of the first and/or second stage or during the first and/or second stage rotates about the longitudinal axis, and/or characterized in that the rotary tube or rotary kiln at the inside of the interior space comprises cantilevering devices, preferably cantilevering devices which are distributed inside of the interior space along the entire tube length, wherein the cantilevering devices inside of the interior space are designed for example as lifting vanes, and/or preferably the cantilevering devices inside of the interior space transport the treated potassium sulphate sludge in the direction of the longitudinal axis.

In a preferred embodiment of the method according to the invention the heating in the first stage and/or the second stage is carried out in a hearth-type furnace, preferably in a multi-tier dimensioned hearth furnace, preferably in a hearth-type furnace equipped with semi paddles and with a gas entry and a gas exhaust, which can control heat input along the material transport.

The invention further pertains to a system for use in the treatment of residues from the biodiesel production of for the isolation of highly pure potassium sulphate from potassium sulphate containing sludge, which system is suitable for performing the method of the invention, as described above.

In a preferred embodiment the system according to the present invention comprises two communicating, longish dimensioned, reaction spaces, the first and the second reaction space, wherein each reaction space is separately heatable, and can be charged with gas. It is definitely preferred that the first and/or second reaction space is designed such that the transport within the reactor occurs without re-mixing. It is also preferred that the first reaction space is suitable for transporting the treated potassium sulphate-containing sludge into a direction (for example the longitudinal axis) from one end of the first reaction space (the first beginning) to the other end of the first reaction space (the first end), so that the treated potassium sulphate-containing sludge having been transported to the first end of the first reaction space is charged into the beginning of the second reaction space (the second beginning) and can be transported in it to the end of the second reaction space (the second end).

In a preferred embodiment of the system according to the present invention the first tube has a gas connection suitable for feeding an oxygen-free gas, preferably nitrogen, into the first tube and/or the second tube has a gas connection suitable for feeding an oxygen-containing gas, preferably air, into the second tube. Here, it is particularly preferred that the gas connection for feeding an oxygen-containing gas, preferably air, into the second tube is positioned in immediate proximity to the end of the second reaction space (the second end).

In a preferred embodiment of the system according to the present invention the first reaction space is designed such that its interior can be heated to temperatures of 450° C. to 600° C. and/or the second reaction space is designed such that its interior can be heated to temperatures of 750° C. to 850° C.

In a preferred embodiment of the system according to the invention the first and/or second reaction space is designed as a rotary tube, preferably designed as a rotary tube of a rotary kiln, which tube can be heated through the outer wall, wherein preferably the rotary tube or the pipe of the rotary kiln during heating of the first and/or second stage or during the first and/or second stage rotates about the longitudinal axis, and/or the rotary tube or rotary kiln at the inside of the interior space comprises cantilevering devices, preferably cantilevering devices which are distributed inside of the interior space along the entire tube length, wherein the cantilevering devices inside of the interior space are designed for example as lifting vanes, and/or preferably the cantilevering devices inside of the interior space transport the treated potassium sulphate sludge in the direction of the longitudinal axis.

In a preferred embodiment of the system according to the invention the first and/or the second reaction space is designed as a hearth-type furnace dimensioned in a longish fashion, preferably as a multi-tier hearth-type furnace dimensioned in a longish fashion with several spatially separated heat sources, which preferably are positioned along the longitudinal axis of the hearth-type furnace dimensioned in a longish fashion.

The following section describes a flowchart (FIG. 1) which exemplary depicts the principle method of the invention, which depiction is not to be seen as limiting.

EXAMPLES

Example 1

Exemplary Method with Flowchart as in FIG. 1

As shown in FIG. 1 potassium sulphate containing residues from the biodiesel production with a proportion of <10% organic material from a first warehouse are mixed with potassium sulphate containing residues from the biodiesel production with a proportion of >20% organic material from a second warehouse in a mixer, thus resulting in a processing residue with a proportion of ca. 15% organic material. This residue is then introduced through an infeed conveyor into a first rotary tube, or the upper tier of a hearth-type furnace, where it is then carbonised under reducing conditions through blowing in of exhaust gases from understochiometric incineration.

The exhaust gas/pyrolysis gas produced by this carbonisation and pyrolysis is collected, mixed with exhaust gas which is produced in a later process and is then partially fed into the carbonisation process via the non-oxidizing hot gas. The hot gas is heated here for the carbonisation/pyrolysis. The other part is added to the oxidizing hot gas for the second stage.

The pyrolized/carbonised residue is fed into a second rotary tube or the lower tier of a hearth type furnace and there is subjected to incineration of the remaining carbon in its entirety. Air is fed into the oxidizing hot gas, prior to its introduction.

The resulting exhaust gases are either re-fed into the hot gases used in the reaction (see above) or they are purified.

The invention claimed is:

1. Method for the treatment of residues from biodiesel production, for the isolation of highly pure potassium sulphate from potassium sulphate-containing sludge, characterized in that the method is carried out in two spatially and/or temporally separate stages, wherein
   in the first stage potassium sulphate-containing sludge is initially heated under non-oxidizing conditions, wherein the temperature of the potassium sulphate-containing sludge is between 400 and 700° C.; and
   in a second stage the product of the first stage is heated under oxidizing conditions, wherein the temperature of the product of the first stage is between 700 and 900° C.

2. A method according to claim 1, characterized in that
   in the first stage
   the heating takes place under a nitrogen atmosphere, and/or
   the sludge is heated to temperatures of between 450 and 600° C. and/or
   in the second stage, the product of the first stage is heated to temperatures of between 750 and 850° C.

3. A method according to claim 1, characterized in that the heating in the first stage is performed in a first reaction space, and in a second reaction space in the second stage and the first and/or second reaction space is designed such that transport within the reactor takes place without re-mixing.

4. A method according to claim 3, characterized in that during the heating of the first stage in the first reaction space and/or during the heating of the second stage in the second reaction space, the potassium sulphate-containing sludge is transported from one end of the respective reaction space to the other end of the reaction space.

5. A method according to claim 1, characterized in that in the first stage the potassium sulphate containing sludge is fumigated with an oxygen free gas.

6. A method according to claim 1, wherein flue gas is formed in the first stage, is removed and is transferred to thermal afterburning.

7. A method according to claim 1, characterized in that the retention time of the potassium sulphate-containing sludge in the first stage is adjusted such that at the end of the treatment of the first stage the potassium sulphate-containing sludge consists essentially of potassium sulphate and elemental carbon.

8. A method according to claim 1, characterized in that in the second stage the potassium sulphate containing sludge is fumigated with an oxygen-containing gas.

9. A method according to claim 4, characterized in that in the second stage the potassium sulphate-containing sludge is fumigated with oxygen-containing gas, wherein the fumigation with oxygen-containing gas is carried out in counterflow, wherein the potassium sulphate-containing sludge in the second reaction space is moved in a direction, wherein the stream of oxygen-containing gas flows against the direction of motion of the potassium sulphate-containing sludge.

10. A method according to claim 1, characterized in that the retention time of the potassium sulphate-containing sludge in the second stage is 1 h to 2 h.

11. A method according to claim 1, characterized in that the retention time of the potassium sulphate-containing sludge in the second stage is adjusted such that the carbon content at the material discharge is less than 0.01 weight %.

12. A method according to claim 1, characterized in that
   the heating in the first and second stage is carried out in a reaction space which is longish-dimensioned, and
   the potassium sulphate-containing sludge in the first and second stage is transported, in the interior of the reaction space, in a direction of the longitudinal axis from one end of the reaction space to the other end of the reaction space, wherein the potassium sulphate-containing sludge is transported from the end of the first reaction space into the beginning of the second reaction space, while
   the retention time of the potassium sulphate-containing sludge in the first stage is adjusted such that at the end of the treatment of the first stage the potassium sulphate-containing sludge contains only potassium sulphate and elemental carbon, and
   the retention time of the potassium sulphate-containing sludge is adjusted in the second stage to 1 h to 2 h.

13. A method according to claim 1, characterized in that the heating in the first stage and/or the second stage is carried out in a rotary tube or a rotary kiln,
   and/or characterized in that a rotary tube or a rotary kiln at the inside of the interior space comprises cantilevering devices, wherein the cantilevering devices inside of the interior space are designed as lifting vanes.

14. A method according to claim 1, characterized in that the heating in the first stage and/or the second stage is carried out in a hearth-type furnace.

15. A method according to claim 5, wherein said oxygen free gas is nitrogen.

16. A method according to claim 8, wherein said oxygen-containing gas is air [$Nm^3$] in a ratio of 0.05-0.5 based on the weight [kg] of the potassium sulphate-containing sludge.

17. A method according to claim 16, wherein said oxygen-containing gas is air [Nm$^3$] in a ratio of 0.1-0.2, based on the weight [kg] of the potassium sulphate-containing sludge.

18. A method according to claim 13, characterized in that the heating in the first stage and/or the second stage is carried out in a rotary tube or a rotary kiln, wherein said rotary tube is equipped with baffle rings, in which the rotary tube equipped with baffle rings is heated through the outer wall,
   characterized in that the rotary tube or the pipe of the rotary kiln during heating of the first and/or second stage or during the first and/or second stage rotates about the longitudinal axis,
   and/or characterized in that the rotary tube or rotary kiln at the inside of the interior space comprises cantilevering devices which are distributed inside of the interior space along the entire tube length, wherein the cantilevering devices inside of the interior space are designed as lifting vanes, and/or the cantilevering devices inside of the interior space transport the potassium sulphate-containing sludge in the direction of the longitudinal axis.

19. A method according to claim 14, characterized in that the heating in the first stage and/or the second stage is carried out in a hearth-type furnace equipped with semi paddles and with a gas entry and a gas exhaust, which controls heat input.

\* \* \* \* \*